United States Patent
Yamada et al.

(10) Patent No.: US 8,526,068 B2
(45) Date of Patent: Sep. 3, 2013

(54) ROTATABLE SCANNER AND IMAGE FORMING APPARATUS

(75) Inventors: Kazuyoshi Yamada, Yokohama (JP); Tomohiko Sasaki, Mitaka (JP)

(73) Assignee: Ricoh Company, Ltd., Tokyo (JP)

( * ) Notice: Subject to any disclaimer, the term of this patent is extended or adjusted under 35 U.S.C. 154(b) by 581 days.

(21) Appl. No.: 12/320,761

(22) Filed: Feb. 4, 2009

(65) Prior Publication Data

US 2009/0201559 A1 Aug. 13, 2009

(30) Foreign Application Priority Data

Feb. 8, 2008 (JP) ................................. 2008-029798
Feb. 12, 2008 (JP) ................................. 2008-031065

(51) Int. Cl.
*H04N 1/04* (2006.01)

(52) U.S. Cl.
USPC ............ 358/474; 358/482; 358/483; 358/498

(58) Field of Classification Search
USPC .................... 358/474, 482, 483, 498
See application file for complete search history.

(56) References Cited

U.S. PATENT DOCUMENTS

| | | | |
|---|---|---|---|
| 6,226,475 B1 | 5/2001 | Kabumoto et al. | |
| 6,259,866 B1 | 7/2001 | Kabumoto et al. | |
| 6,389,249 B2 | 5/2002 | Kabumoto et al. | |
| 6,396,410 B1 | 5/2002 | Kabumoto et al. | |
| 6,526,242 B2 | 2/2003 | Kabumoto et al. | |
| 7,016,629 B2 | 3/2006 | Ishii et al. | |
| 7,389,064 B2 | 6/2008 | Sasaki | |
| 2002/0056957 A1* | 5/2002 | Sekine | 271/3.14 |
| 2004/0090474 A1* | 5/2004 | Ogushi et al. | 347/3 |
| 2006/0103858 A1 | 5/2006 | Yamada et al. | |
| 2006/0110179 A1 | 5/2006 | Sasaki | |
| 2006/0120763 A1 | 6/2006 | Ishii et al. | |
| 2008/0101822 A1 | 5/2008 | Sasaki | |
| 2009/0174916 A1* | 7/2009 | Ootsuka et al. | 358/498 |

FOREIGN PATENT DOCUMENTS

| | | |
|---|---|---|
| CN | 2567919 Y | 8/2003 |
| JP | 01-071735 | 5/1989 |
| JP | 8-337349 | 12/1996 |
| JP | 09-142716 | 6/1997 |
| JP | 10-208107 | 8/1998 |
| JP | 2002-082590 | 3/2002 |
| JP | 2002-145457 A | 5/2002 |
| JP | 2004-088350 A | 3/2004 |
| JP | 2004-138683 | 5/2004 |
| JP | 2004-212494 | 7/2004 |

(Continued)

OTHER PUBLICATIONS

European Search Report for corresponding European application dated Oct. 14, 2009.
Communication dated Aug. 30, 2011, issued by the Japan Patent Office for corresponding Japanese Application No. 2008-029798.
Communication dated Jul. 2, 2010, issued by the Chinese Patent Office for corresponding Chinese Application No. 200910007129.4.
Japanese Office Action dated Apr. 5, 2012, issued in corresponding Japanese Patent Application No. 2008-031065.

(Continued)

*Primary Examiner* — Houshang Safaipour
(74) *Attorney, Agent, or Firm* — Harness, Dickey & Pierce, P.L.C.

(57) ABSTRACT

A rotatable scanner includes a scanner body and a document holder. The scanner body includes an exposure surface on which a document is placed. The document holder is provided above the scanner body to cover a document placed on the exposure surface of the scanner body, and includes a hinged side and a free side opposite the hinged side. A front upper edge of the scanner body is chamfered.

14 Claims, 8 Drawing Sheets

(56) References Cited

FOREIGN PATENT DOCUMENTS

| JP | 2005-020667 | 1/2005 |
| JP | 2005-242267 | 9/2005 |
| JP | 2007-078855 | 3/2007 |
| JP | 2007-329801 | 12/2007 |
| JP | 2008-009377 | 1/2008 |

OTHER PUBLICATIONS

Japanese Office Action dated Mar. 12, 2013, for corresponding Japanese application 2012-235518.

* cited by examiner

ROTATABLE SCANNER AND IMAGE FORMING APPARATUS

PRIORITY STATEMENT

The present patent application claims priority from Japanese Patent Application Nos. 2008-029798, filed on Feb. 8, 2008, and 2008-031065, filed on Feb. 12, 2008 in the Japan Patent Office, the entire contents of each of which are hereby incorporated herein by reference.

BACKGROUND OF THE INVENTION

1. Field of the Invention

Example embodiments generally relate to a rotatable scanner and an image forming apparatus including the rotatable scanner, in which the rotatable scanner has a compact structure that facilitates lifting of the scanner.

2. Description of the Related Art

Image forming apparatuses, such as copiers, facsimile machines, printers, and multifunction devices having at least one of copying, printing, scanning, and facsimile functions, typically form a toner image on a recording medium (e.g., a sheet) based on image data using electrophotography.

For example, a charging device charges a surface of a photoconductor serving as an image carrier. An optical writer emits a light beam onto the charged surface of the photoconductor to form an electrostatic latent image on the photoconductor according to the image data. A development device develops the electrostatic latent image with a developer (e.g., toner) to form a toner image on the photoconductor. A primary transfer roller transfers the toner image formed on the photoconductor onto an intermediate transfer belt. After a secondary transfer roller transfers the toner image carried by the intermediate transfer belt onto a sheet, the toner image is fixed on the sheet by heat and pressure applied by a fixing device. Thus, the toner image is formed on the sheet.

After image formation, the sheet bearing the toner image is discharged to an output tray provided on an upper surface of the image forming apparatus. One known related-art image forming apparatus includes a rotatable scanner provided at the rear of the image forming apparatus, with the output tray attached to a bottom surface of a scanner body. Since the rotatable scanner rotates upwards, a user can visually confirm the discharged sheet stacked on the output tray and easily remove the sheet. In addition, a front edge of a document holder portion of the scanner includes a concave portion that enables the user to easily catch the document holder to lift the scanner.

However, due to growing demand for compact and lightweight image forming apparatuses, the document holder has become thinner, and consequently the height of the concave portion has shrunk. As a result, the user has trouble catching the concave portion to lift the scanner.

Accordingly, there is a need for a compact image forming apparatus including a compact rotatable scanner that still enables a user to easily lift the scanner.

SUMMARY

At least one embodiment provides a rotatable scanner that includes a scanner body and a document holder. The scanner body includes an exposure surface on which a document is placed. The document holder is provided above the scanner body to cover a document placed on the exposure surface of the scanner body, and includes a hinged side and a free side opposite the hinged side. The scanner body includes a chamfered front upper edge provided on a side corresponding to the free side of the document holder.

At least one embodiment provides an image forming apparatus that includes a rotatable scanner and an image forming apparatus body. The rotatable scanner includes a scanner body and a document holder. The scanner body includes an exposure surface on which a document is placed. The document holder is provided above the scanner body to cover a document placed on the exposure surface of the scanner body, and includes a hinged side and a free side opposite the hinged side. The scanner body includes a chamfered front upper edge provided on a side corresponding to the free side of the document holder. The image forming apparatus body mounts the rotatable scanner, and includes an output tray provided on an upper surface of the image forming apparatus body.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

Figure 1:
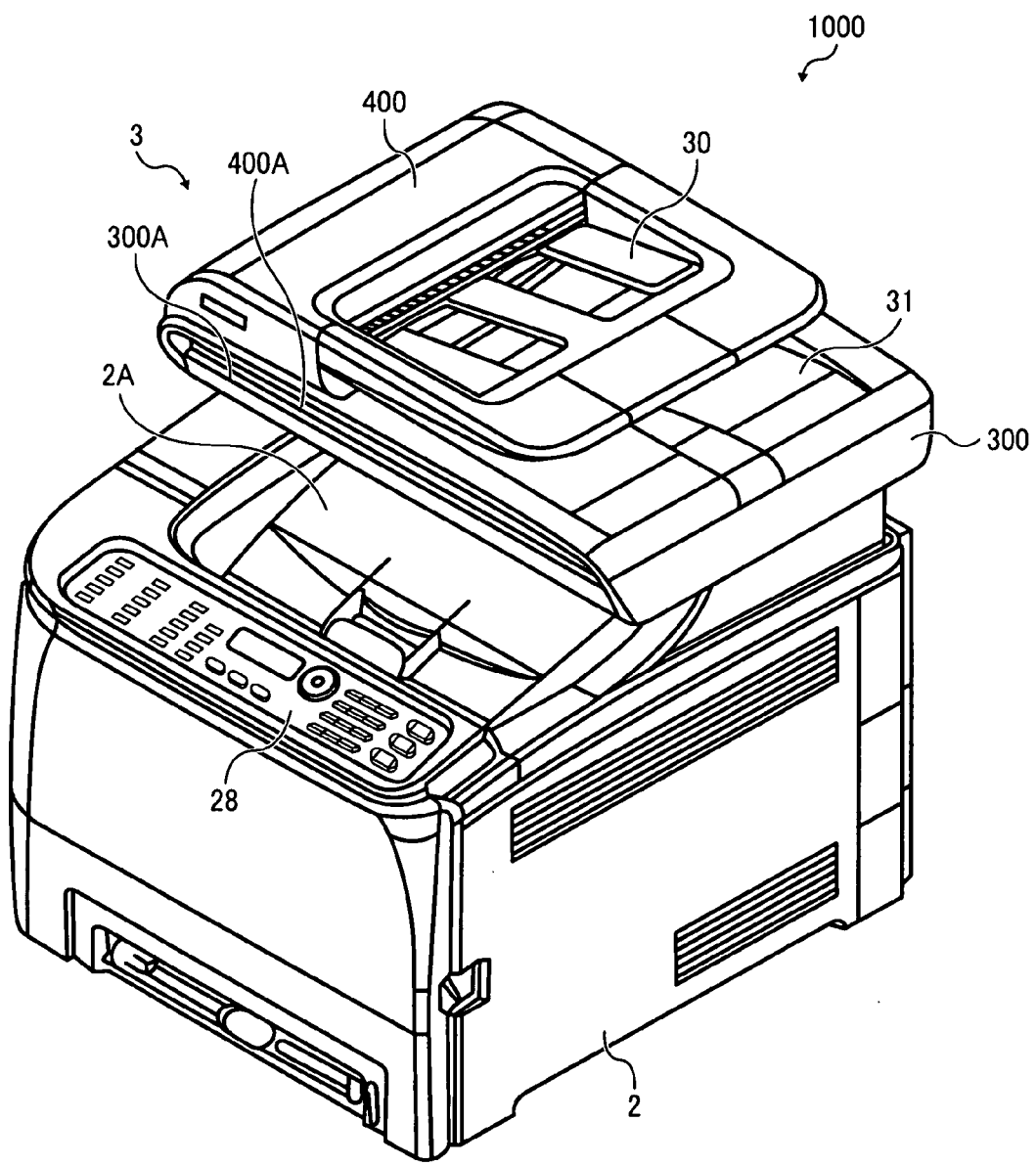
FIG. 1 is a schematic perspective view of an image forming apparatus according to an example embodiment.

The accompanying drawings are intended to depict example embodiments and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views thereof, in particular to FIG. 1, an image forming apparatus 1000 according to an example embodiment of the present invention are described.

FIG. 1 is a schematic perspective view of the image forming apparatus 1000. The image forming apparatus 1000 includes an image forming apparatus body 2 and/or a rotatable scanner 3. The body 2 includes an output tray 2A and/or a control panel 28. The rotatable scanner 3 includes a scanner body 300 and an automatic document feeder 400. The scanner body 300 includes a sloped surface 300A. The automatic document feeder 400 includes an original tray 30, an original discharge tray 31, and/or a concave portion 400A.

The image forming apparatus 1000 may be a copier, a facsimile machine, a printer, a multifunction printer having at least one of copying, printing, scanning, and facsimile functions, or the like. According to this example embodiment, the image forming apparatus 1000 forms a full-color toner image by superimposing yellow, magenta, cyan, and black toner images on each other on an intermediate transfer belt 110. However, it is to be noted that the image forming apparatus 1000 is not limited to a full-color image forming apparatus and may form a color and/or monochrome image with other structure.

The rotatable scanner 3 is provided above the image forming apparatus body 2. The output tray 2A, to which a printed sheet is discharged, is provided on an upper surface of the image forming apparatus body 2. When an original document is placed on the original tray 30, the automatic document feeder 400, functioning as a document holder, activates to feed the original document into the automatic document feeder 400. Then, after the rotatable scanner 3 scans an image formed on the original document placed on an exposure glass, described later, provided inside the automatic document feeder 400, the original document is discharged to the original discharge tray 31. When a plurality of original documents is put on the original tray 30, each of the plurality of original documents is sequentially conveyed to the original discharge tray 31 and stacked thereon. When the automatic document feeder 400 is not used, a user lifts the automatic document feeder 400 to rotate it upwards and out of the way, puts the original document on the exposure glass, and closes the automatic document feeder 400 to cover the original document put on the exposure glass. That is, the original document is sandwiched between the automatic document feeder 400 and the scanner body 300. The scanner body 300 then scans the original document and obtains original document image information.

Figure 2:
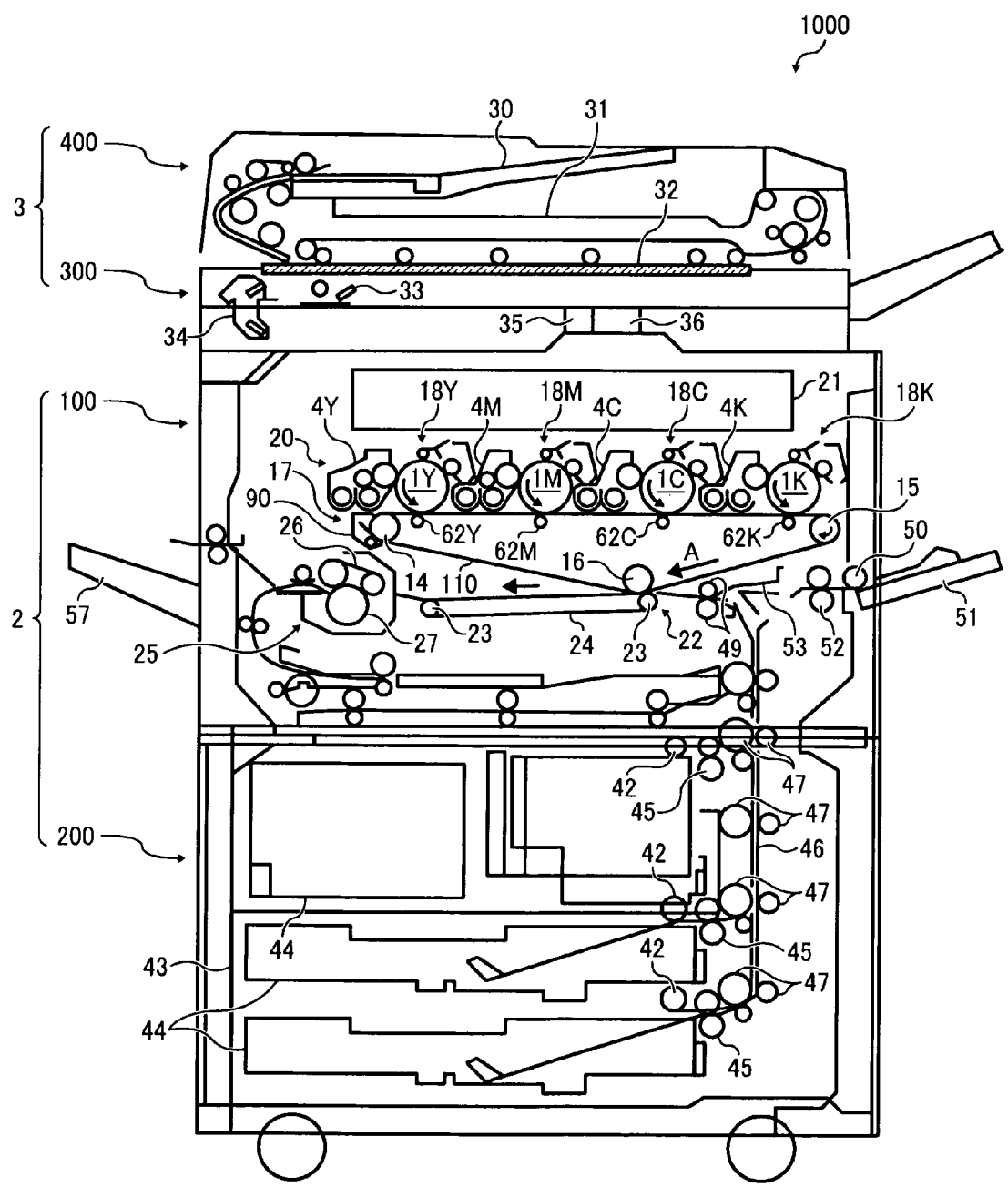
FIG. 2 is a schematic sectional view of the image forming apparatus shown in FIG. 1.

Referring to FIG. 2, a description is now given of internal structure and operation of the image forming apparatus 1000. FIG. 2 is a schematic sectional view of the image forming apparatus 1000, which in this example embodiment is a tandem-type full-color laser copier including a plurality of image carriers, also called photoconductors, provided side by side. Although an appearance of the image forming apparatus 1000 depicted in FIG. 2 is slightly different from that of the image forming apparatus 1000 depicted in FIG. 1, the basic structure thereof is the same.

The scanner body 300 further includes an exposure glass 32, a first traveling body 33, a second traveling body 34, an image focusing lens 35, and/or a read sensor 36.

The image forming apparatus body 2 further includes a printer 100 and/or a feeding device 200. The printer 100 includes an image forming unit 20 and/or an output tray 57. The image forming unit 20 includes process cartridges 18Y, 18M, 18C, and 18K, an optical writing unit 21, an intermediate transfer unit 17, a secondary transfer device 22, a pair of registration rollers 49, a fixing device 25, and/or development devices 4Y, 4M, 4C, and 4K. The process cartridges 18Y, 18M, 18C, and 18K include image carriers 1Y, 1M, 1C, and 1K, respectively. The intermediate transfer unit 17 includes an intermediate transfer belt 110, a belt cleaner 90, a driven roller 14, a driving roller 15, a secondary transfer backup roller 16, and/or primary transfer bias rollers 62Y, 62M, 62C, and 62K. The secondary transfer device 22 includes tension rollers 23 and/or a conveyance belt 24. The fixing device 25 includes a fixing belt 26 and/or a pressing roller 27. The feeding device 200 includes a paper bank 43, feed rollers 42, separation rollers 45, a feed path 46, a pair of conveyance rollers 47, a bypass tray 51, a bypass feed roller 50, a separation roller 52, and/or a bypass feed path 53. The paper bank 43 includes multiple paper trays 44.

The printer 100 is provided on the feeding device 200. The scanner body 300 is provided on the printer 100. The automatic document feeder 400 is provided on the scanner 300, and is capable of rotating.

The process cartridges 18Y, 18M, 18C, and 18K form yellow, magenta, cyan, and black toner images, respectively.

The optical writing unit 21 includes a light source, a polygon mirror, an f-θ lens, and/or a reflecting mirror, and directs a laser beam onto respective surfaces of the image carriers 1Y, 1M, 1C, and 1K based on image data, so that an electrical potential of an irradiation portion (exposure portion) of the respective surfaces of the image carriers 1Y, 1M, 1C, and 1K is attenuated. As a result, an electrostatic latent image is formed on the respective surfaces of the image carriers 1Y, 1M, 1C, and 1K. The development devices 4Y, 4M, 4C, and 4K develop the electrostatic latent images formed on the respective surfaces of the image carriers 1Y, 1M, 1C, and 1K into visible toner images.

The toner images formed on the image carriers 1Y, 1M, 1C, and 1K are primarily transferred to the intermediate transfer belt 110, respectively. Thereafter, a cleaning device removes toner particles remaining on the respective surfaces of the image carriers 1Y, 1M, 1C, and 1K. After being processed by a lubricant application device, the respective surfaces of the image carriers 1Y, 1M, 1C, and 1K are discharged by a discharger, and uniformly supplied with an electrical charge by a charger, returning to an initial condition.

The intermediate transfer belt 110 is wrapped around the driven roller 14, the driving roller 15, the secondary transfer backup roller 16, and the primary transfer bias rollers 62Y, 62M, 62C, and 62K, and moves in a direction A due to rotation of the driving roller 15 driven by a motor.

The primary transfer bias rollers 62Y, 62M, 62C, and 62K are provided on an inner circumferential surface of the intermediate transfer belt 110, and supplied with a primary transfer bias from a power source. In addition, the primary transfer bias rollers 62Y, 62M, 62C, and 62K press the inner circumferential surface of the intermediate transfer belt 110 against the image carriers 1Y, 1M, 1C, and 1K, forming a primary transfer nip between the image carriers 1Y, 1M, 1C, and 1K and the primary transfer bias rollers 62Y, 62M, 62C, and 62K, respectively. Due to the primary transfer bias applied to the primary transfer bias rollers 62Y, 62M, 62C, and 62K, a primary transfer electrical field is formed in the primary transfer nip formed between the image carriers 1Y, 1M, 1C, and 1K and the primary transfer bias rollers 62Y, 62M, 62C, and 62K, respectively.

The yellow toner image formed on the image carrier 1Y is primarily transferred onto the intermediate transfer belt 110 by the primary transfer electrical field and a nip pressure. The magenta, cyan, and black toner images formed on the image carriers 1M, 1C, and 1K are sequentially transferred and superimposed onto the intermediate transfer belt 110 bearing the yellow toner image, thereby forming a four-color toner image on the intermediate transfer belt 110.

The four-color toner image formed on the intermediate transfer belt 110 is transferred to a sheet at a secondary transfer nip, described later. After the intermediate transfer belt 110 passes through the secondary transfer nip, the belt cleaner 90 removes residual toner remaining on a surface of the intermediate transfer belt 110 sandwiched between the belt cleaner 90 and the driven roller 14.

The secondary transfer device 22 is provided in a lower portion of the intermediate transfer unit 17. The conveyance belt 24 is wrapped around two tension rollers 23, and moves due to rotation of at least one of the tension rollers 23. The intermediate transfer belt 110 and the conveyance belt 24 are sandwiched between the tension roller 23 provided to the right in FIG. 2 and the secondary transfer backup roller 16, thereby forming the secondary transfer nip between the intermediate transfer belt 110 and the conveyance belt 24 contacting each other. Since the tension roller 23 is supplied with a secondary transfer bias having a polarity opposite to that of toner particles, a secondary transfer electrical field is formed at the secondary transfer nip to cause the four-color toner image formed on the intermediate transfer belt 110 to electrostatically transfer to the tension roller 23. When the four-color toner image formed on the intermediate transfer belt 110 reaches the secondary transfer nip, the pair of registration rollers 49 feeds a sheet to the secondary transfer nip, thereby transferring the four-color toner image to the sheet by the secondary transfer electrical field and a nip pressure. It is to be noted that instead of such a secondary transfer method of supplying the tension roller 23 with the secondary transfer bias, a charger charging a sheet in a non-contact manner may be provided.

The feeding device 200 is provided in a lower portion of the image forming apparatus body 2. The plurality of paper trays 44 is provided in the feeding device 200, vertically separated from each other and capable of storing a plurality of sheets in a stack. The feed roller 42 contacts an uppermost sheet stacked in the paper tray 44. As the feed roller 42 rotates, the uppermost sheet is conveyed to the feed path 46.

The pair of registration rollers 49 is provided in the vicinity of an end portion of the feed path 46. The sheet fed from the paper tray 44 is conveyed through the feed path 46 to the pair of registration rollers 49 via the plurality of pairs of conveyance rollers 47, and sandwiched between the pair of registration rollers 49. The four-color toner image formed on the intermediate transfer belt 110 moves to the secondary transfer nip formed between the intermediate transfer belt 110 and the conveyance belt 24 as rotation of the intermediate transfer belt 110. The pair of registration rollers 49 feeds the sheet at a proper time when the four-color toner image formed on the intermediate transfer belt 110 is transferred onto the sheet at the secondary transfer nip. As a result, a full color toner image is formed on the sheet. The sheet bearing the full color toner image moves as rotation of the conveyance belt 24 and is conveyed to the fixing device 25.

The fixing device 25 uses a belt fixing method. The fixing belt 26 is wrapped around two rollers, and rotates, forming a belt unit. The pressing roller 27 presses the fixing belt 26. The fixing belt 26 and the pressing roller 27 contact each other, forming a fixing nip therebetween to receive the sheet conveyed from the conveyance belt 24. One of the rollers included in the belt unit, pressed against the pressing roller 27, includes a heat source provided inside the roller to heat the fixing belt 26. The heated fixing belt 26 heats the sheet received by the fixing nip formed between the fixing belt 26 and the pressing roller 27. Due to heating and a nip pressure, the full color toner image is fixed to the sheet.

After this fixing process performed by the fixing device 25, the sheet is discharged to the output tray 57 protruding from a side plate of the image forming apparatus body 2. Alternatively, the sheet is again conveyed to the secondary transfer nip, so as to form another toner image on the other side of the sheet.

In order to make a copy of the original document, for example, a stack of original documents is set on the original tray 30 of the automatic document feeder 400. Alternatively, separate pages of the original document are set on the exposure glass 32. It is to be noted that the exposure glass 32, serving as an exposure surface, used as a contact plate may be not glass but a plastic sheet, for example, acrylic and the like. That is, the exposure glass 32 may be of any transparent material.

When each page of the original document is set on the exposure glass 32, a user lifts the automatic document feeder 400 to rotate upwards from the image forming apparatus body 2 to expose the exposure glass 32. Then, the user puts the original document on the exposure glass 32 and rotates the automatic document feeder 400 downwards, so that the original document is sandwiched between the automatic document feeder 400 and the exposure glass 32.

After the original document is set on the exposure glass 32, the user presses a copy key to order start of reading of the original document by the scanner body 300. When the user puts the original document on the automatic document feeder 400, the automatic document feeder 400 automatically moves the original document to the exposure glass 32. When the first traveling body 33 and the second traveling body 34 together start traveling, a light source provided in the first traveling body 33 emits light. After being reflected from an original document surface, the light is then reflected by a mirror, passes through the image focusing lens 35, and strikes the read sensor 36, which constructs image information based on the light.

As this is carried out, each device included in each of the process cartridges 18Y, 18M, 18C, and 18K, the intermediate transfer unit 17, the secondary transfer device 22, and the fixing device 25 start operation, respectively. Based on the image information constructed by the read sensor 36, the optical writing unit 21 performs writing to form yellow, magenta, cyan, and black toner images on the respective surfaces of the image carriers 1Y, 1M, 1C, and 1K. The respective toner images are transferred and superimposed onto the intermediate transfer belt 110, forming a four-color toner image.

Simultaneously with the start of reading by the scanner body 300, the feeding device 200 starts feeding a sheet. One of the plurality of feed rollers 42 selectively rotates to feed a sheet from one of the plurality of paper tray 44 provided in the paper bank 43. When the separation roller 45 separates one sheet from another to feed each sheet to the feed path 46, the pair of conveyance rollers 47 conveys the sheet toward the secondary transfer nip. Instead of the paper tray 44, the bypass tray 51 feeds a sheet. The bypass feed roller 50 selectively rotates to feed the sheet to the inside of the image forming apparatus 1000. Although a plurality of sheets tends to be simultaneously conveyed due to friction force acting on each other, the separation roller 52 separates one sheet from another, so that each sheet is conveyed to the bypass feed path 53 of the printer 100.

In formation of a multiple color image including two or more toner images, the image carriers 1Y, 1M, 1C, and 1K contact an upper surface of the intermediate transfer belt 110 stretched substantially in a horizontal direction. However, in a monochrome image formation, a mechanism, not shown, causes the intermediate transfer belt 110 to incline to the left in FIG. 2 to separate the upper surface of the intermediate transfer belt 110 from the image carriers 1Y, 1M, and 1C. Thus, the image carrier 1K rotates and forms a black toner image. Under such conditions, the development devices 4Y, 4M, 4C, and 4K also stop operation, respectively.

The image forming apparatus 1000 includes a controller including a CPU and the like controlling each device included in the image forming apparatus 1000. The control panel 28 depicted in FIG. 1 includes a liquid crystal display, various keys, and the like. The user can choose either a single-sided printing mode or a duplex printing mode by input operation using the control panel 28 to transmit a command to the controller.

Figure 3:
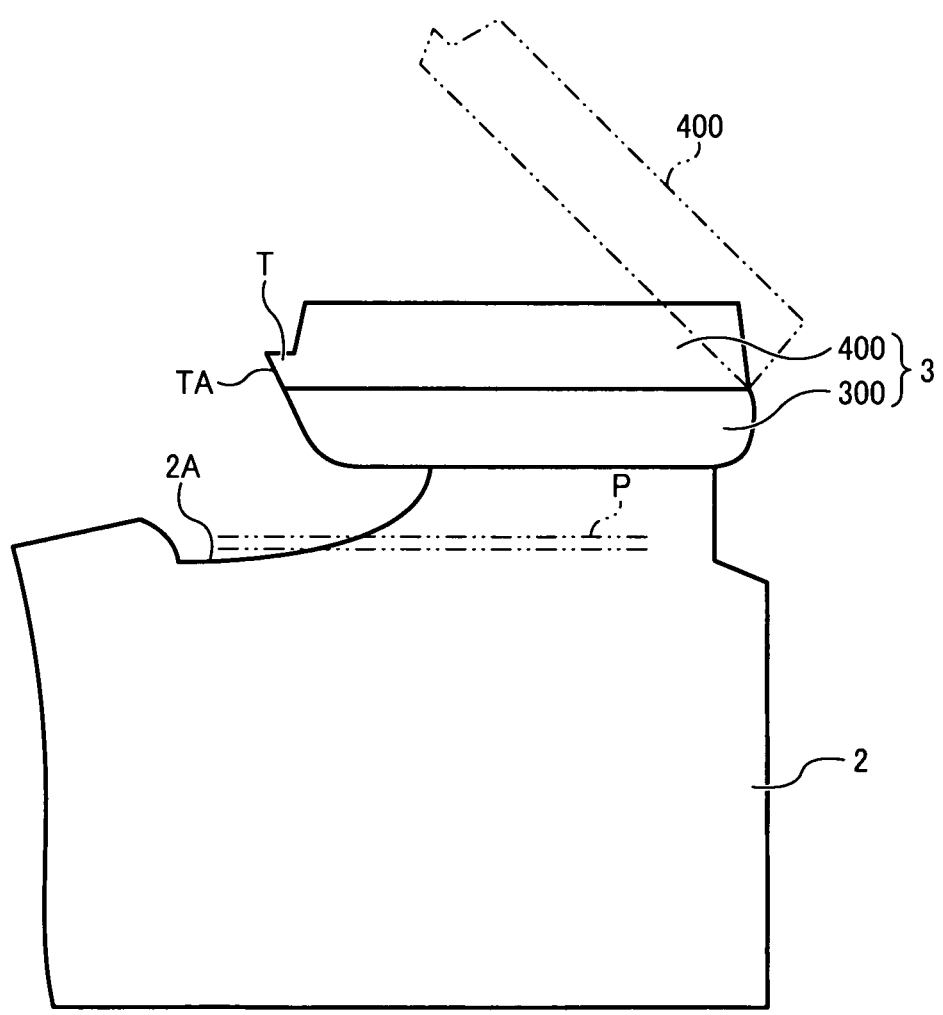
FIG. 3 is a schematic side view of the image forming apparatus shown in FIG. 2.
Figure 4:
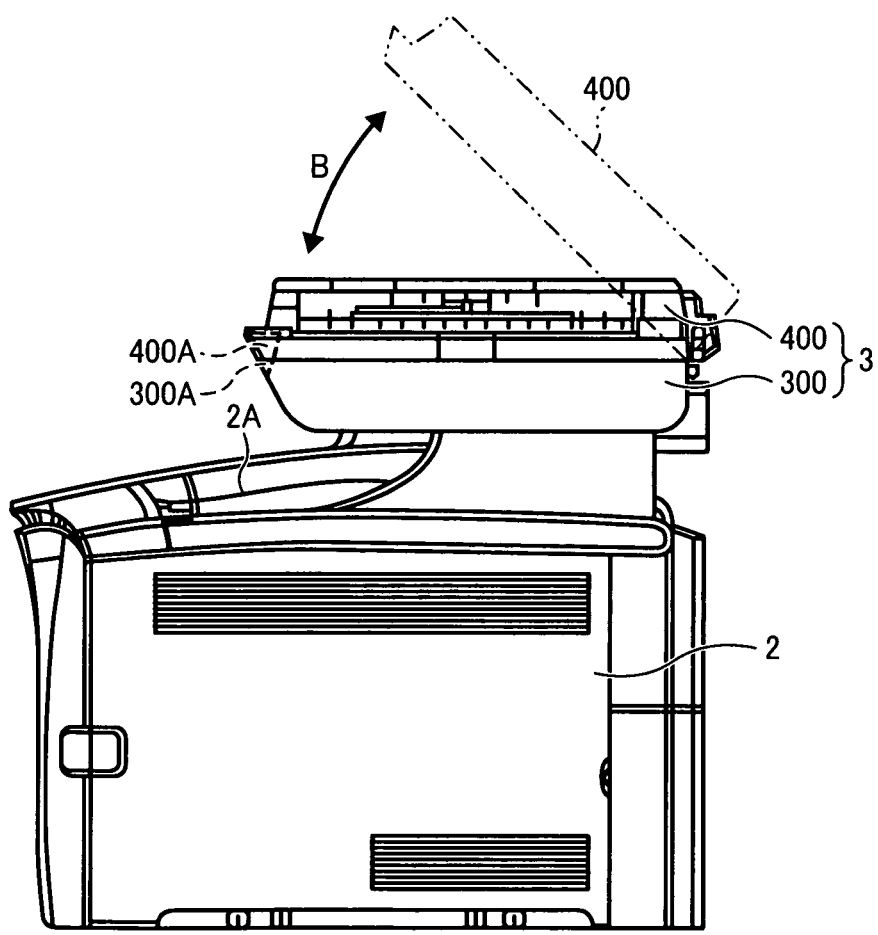
FIG. 4 is a side view of the image forming apparatus shown in FIG. 3.

Referring to FIGS. 3 and 4, a description is now given of a structure of the rotatable scanner 3. FIG. 3 is a schematic side view of the image forming apparatus 1000. The automatic document feeder 400 further includes a catch portion T. The catch portion T includes a sloped portion TA.

The catch portion T is provided on the front of the automatic document feeder 400 and extends obliquely upwards to the proximal end of the automatic document feeder 400 to protrude from the front surface of the scanner body 300. As a result, the user can easily grasp the catch portion T to raise the automatic document feeder 400. Due to the above, the image forming apparatus 1000 does not increase in depth. Moreover, the user can easily access and remove the sheet discharged to the output tray 2A provided on the upper surface of the image forming apparatus body 2. In addition, the sloped portion TA of the catch portion T inclines downwards from the proximal end to the distal end of the rotatable scanner 3. Although the sloped surface TA is generally a flat surface as illustrated in FIG. 3, alternatively the sloped portion TA may be curved, stepped, or the like. Also, the catch portion T may have any shape, when it extends obliquely upwards to the proximal end of the automatic document feeder 400 to protrude from the front surface of the scanner body 300.

It is to be noted that, when the automatic document feeder 400 is closed, the user holds the catch portion T and lifts the automatic document feeder 400 to rotate upwards.

FIG. 4 is a side view of the image forming apparatus 1000. Since the rotatable scanner 3 is provided on a distal end of the upper surface of the image forming apparatus body 2, an empty area is formed above a front surface of the image forming apparatus body 2 to enable the user to easily remove the sheet discharged to the output tray 2A. That is, the rotatable scanner 3 is provided in substantially a rearward portion of the image forming apparatus 1000 in order to facilitate removal of the discharged sheet. In addition, a rear surface of the rotatable scanner 3 is substantially flush with a rear surface of the image forming apparatus body 2. This is because protrusion of the rotatable scanner 3 from the rear surface of the image forming apparatus body 2 causes an increased depth of the image forming apparatus 1000 and requires a larger installation space.

The automatic document feeder 400 is attached to a distal end of the scanner body 300, and is rotatable about an axis of rotation in directions indicated by the double-headed arrow B. That is, the document holder includes a hinged side and a free side opposite the hinged side. A front upper edge of the scanner body 3 is chamfered to form the sloped surface 300A. The concave portion 400A is provided on a lower front surface of the automatic document feeder 400 to form a catch portion. Thus, when the user puts their fingers in the concave portion 400A and lifts the automatic document feeder 400, the automatic document feeder 400 rotates upwards to expose the exposure glass 32, serving as an exposure surface, depicted in FIG. 2.

Figure 5:
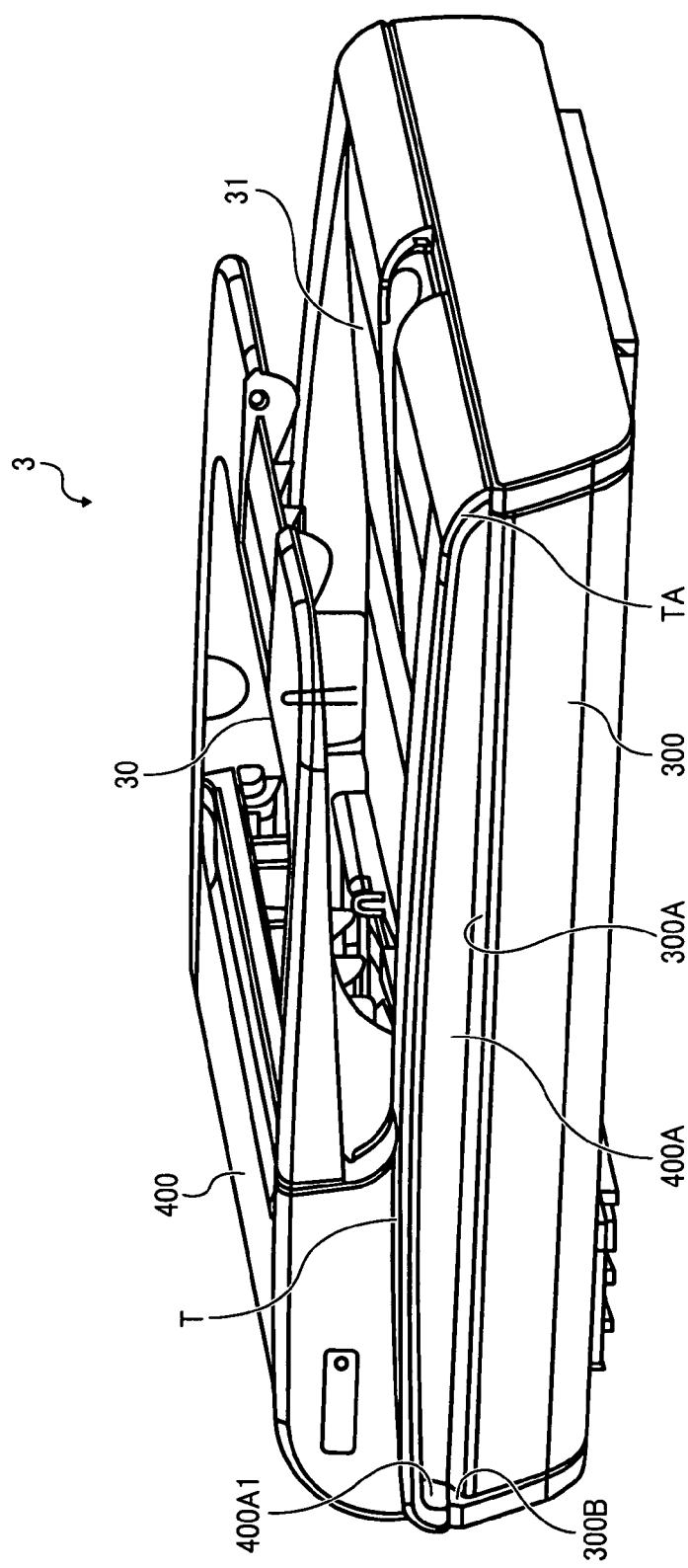
FIG. 5 is a schematic perspective view of a rotatable scanner included in the image forming apparatus shown in FIG. 4.
Figure 6:
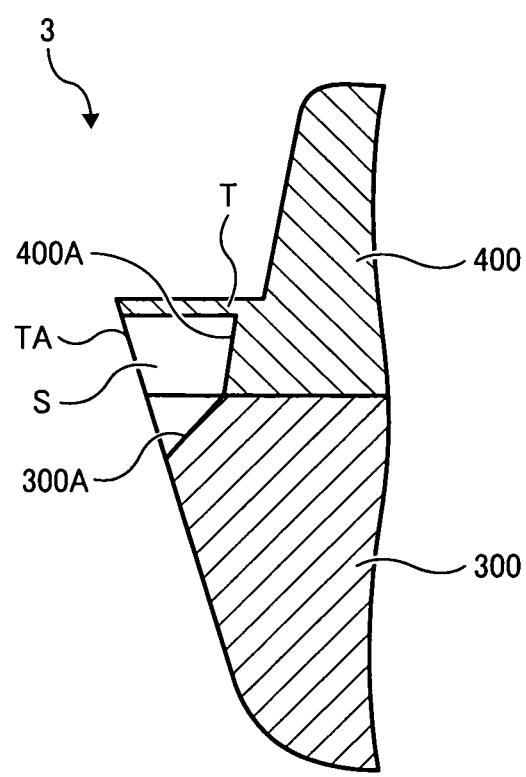
FIG. 6 is a partial sectional view of the rotatable scanner shown in FIG. 5.

Referring to FIGS. 5 and 6, a more detailed description is now given of the rotatable scanner 3. FIG. 5 is a schematic perspective view of the rotatable scanner 3. FIG. 6 is a partial sectional view of the rotatable scanner 3.

As illustrated in FIG. 5, the scanner body 300 further includes a wall 300B. The concave portion 400A includes a wall 400A1. The scanner body 300 has a substantially rectangular parallelepiped shape and a small thickness in response to growing demand for compact and lightweight scanners. The front of the automatic document feeder 400 is beak-shaped. The upper edge of the scanner body 300 provided on the opening and closing side of the automatic document feeder 400 is chamfered to form the sloped surface 300A. As illustrated in FIG. 6, the sloped surface 300A has a planar surface. More specifically, the planar sloped surface 300A inclines downwards to the proximal end of the scanner body 300. It is to be noted that the sloped surface 300A may include any shape easy to lift up the automatic document feeder 400, for example, a round shape. As illustrated in FIG. 6, the concave portion 400A is provided in the catch portion T of the automatic document feeder 400. The sloped surface 300A and the concave portion 400A together form a space S for accommodating the user's fingers, extending in a longitudinal direction of the rotatable scanner 3. For example, the concave portion 400A may include fine surface irregularities to enable the user to easily distinguish the concave portion 400A from other portions by touch. In addition, such irregularities provide a better grip for the user's hands on the automatic document feeder 400 when the user lifts the automatic document feeder 400.

As illustrated in FIG. 5, the wall 300B is vertically provided at both ends of the sloped surface 300A in the longitudinal direction of the scanner body 300 to form the space S. Similarly, the wall 400A1 is provided at both ends of the concave portion 400A in the longitudinal direction of the scanner body 300. Provisions of the wall 300B and the wall 400A1 enable the user to easily ascertain a position of the space S just by touch, thereby making the rotatable scanner 3 convenient for visually-impaired users. Alternatively, after visually confirming the position of the space S, the user inserts their fingers into the space S, moves their hands to the wall 400A1 to confirm a position of an end of the space S, and positions their hands so as to lift easily the automatic document feeder 400. That is, since the user can lift the automatic document feeder 400 by merely feeling with their hands, the rotatable scanner 3 is operable for a variety of tasks. In particular, according to this example embodiment, the rotatable scanner 3 is useful for such operations as copying, faxing, and scanning involving frequent opening and closing of a document holder, that is, the automatic document feeder 400.

In addition, a conventional scanner is less accessible to an occupant of a wheelchair than to a physically unimpaired person. However, according to this example embodiment, such physically impaired person can position their hands appropriately on the rotatable scanner 3 by merely feeling the automatic document feeder 400 and can easily lift up the automatic document feeder 400 without using very much physical force.

According to this example embodiment, the image forming apparatus 1000 includes the automatic document feeder 400, serving as a document holder, in which the catch portion T depicted in FIG. 6 is provided on the front surface of the automatic document feeder 400 and extends obliquely upwards to the proximal end of the automatic document feeder 400 to protrude from the front surface of the scanner body 300. Therefore, the image forming apparatus 1000 does not increase in depth. As a result, the user can easily remove the sheet discharged to the output tray 2A depicted in FIG. 4 provided on the upper surface of the image forming apparatus body 2 and easily lifts the automatic document feeder 400.

According to this example embodiment, the image forming apparatus 1000 includes the rotatable scanner 3 including the scanner body 3 in which the front upper edge of the scanner body 3 is chamfered to form the sloped surface 300A depicted in FIG. 6. Therefore, even when a catch portion, that is, the concave portion 400A depicted in FIG. 6, is not large enough to accommodate the user's fingers, the user can easily lift the automatic document feeder 400 with their fingers. When the sloped surface 300A is largely chamfered, the user can easily insert their fingers into the space S depicted in FIG. 6, even when the concave portion 400A is not provided in the automatic document feeder 400. Accordingly, even though the automatic document feeder 400 decreases in thickness, the user can easily put their fingers in the space S to lift up the automatic document feeder 400.

Figure 7:
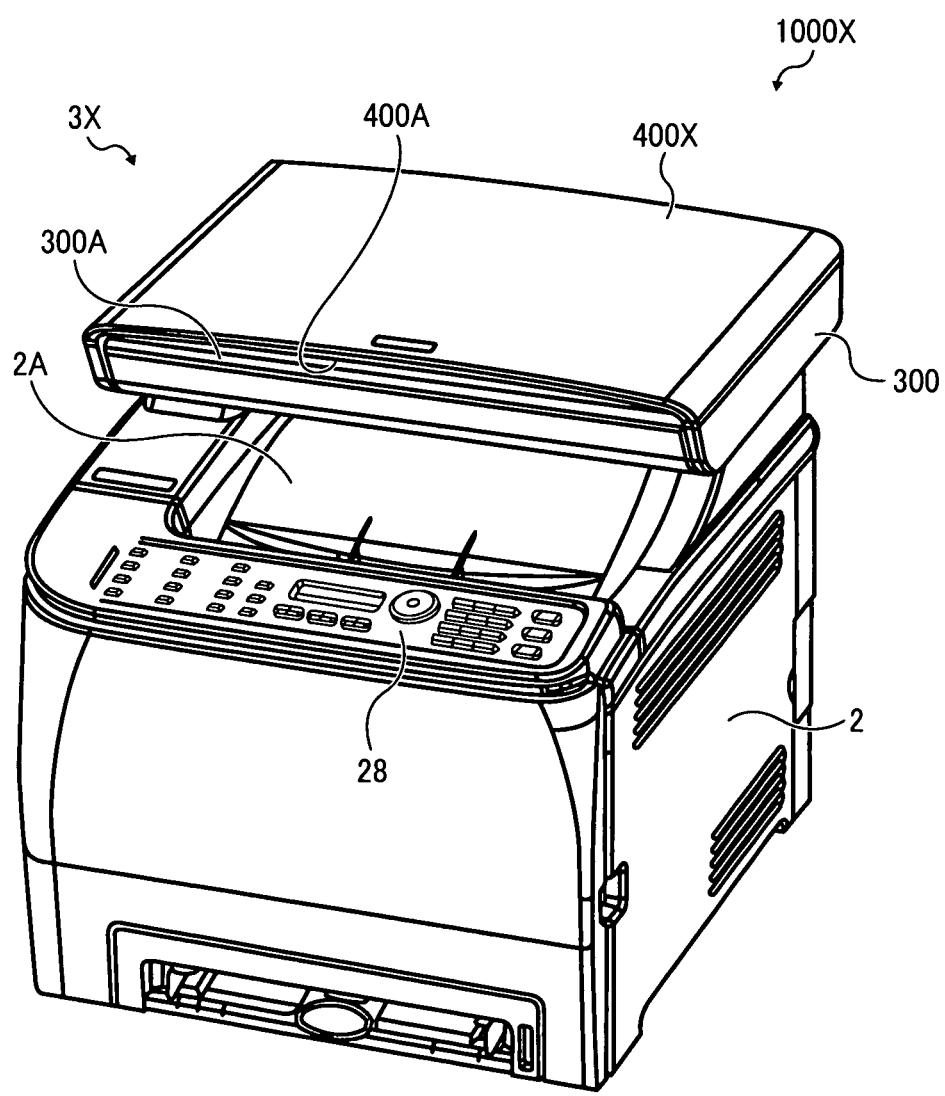
FIG. 7 is schematic perspective view of an image forming apparatus according to another example embodiment.
Figure 8:
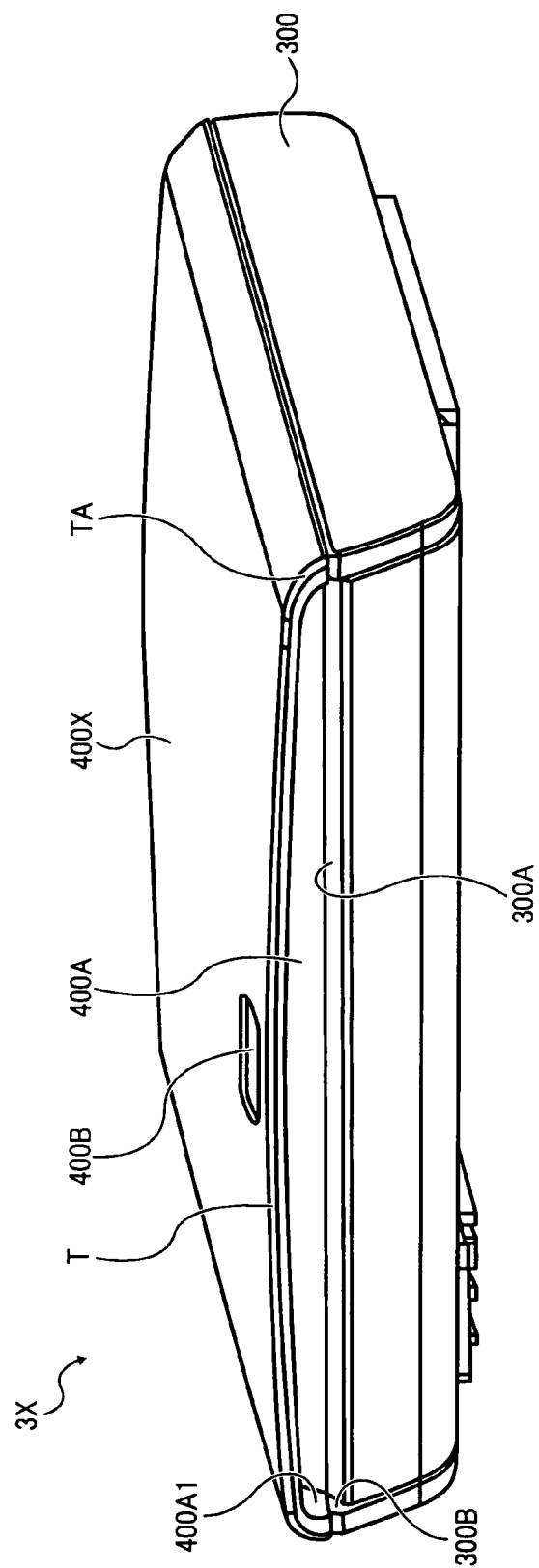
FIG. 8 is a schematic perspective view of a rotatable scanner included in the image forming apparatus shown in FIG. 7.

Referring to FIGS. 7 and 8, a description is now given of an image forming apparatus 1000X according to another example embodiment. FIG. 7 is a schematic perspective view of the image forming apparatus 1000X. The image forming apparatus 1000X includes the image forming apparatus body 2 and/or a rotatable scanner 3X. The rotatable scanner 3X includes the scanner body 300 and/or a press plate 400X. The press plate 400X includes the concave portion 400A. The scanner body 300 includes the sloped surface 300A. The press plate 400X, serving as a document holder, is thinner than the automatic document feeder 400 depicted in FIG. 1 and has a different configuration from that of the automatic document feeder 400.

FIG. 8 is a schematic perspective view of the rotatable scanner 3X. The press plate 400X further includes the catch portion T and/or a mark 400B. As with the rotatable scanner 3 depicted in FIG. 5 in the previous example embodiment, the front upper edge of the scanner body 300 is chamfered to form the sloped surface 300A having a planar surface. The catch portion T is provided on a front of the press plate 400X, and includes the concave portion 400A used for catching the user's hands. The sloped surface 300A and the concave portion 400A form the space S, depicted in FIG. 6, extending in a longitudinal direction of the scanner body 3.

The rotatable scanner 3X has the same effect as that of the rotatable scanner 3 depicted in FIG. 1. Since the press plate 400X is thin, the concave portion 400A does not provide a sufficient space for insertion of the user's fingers. However, since the sloped surface 300A is provided to form the space S, the user can easily insert their fingers into the space S to lift the press plate 400X. In addition, since the press plate 400X curves to the center in a width direction thereof, the user can easily insert their fingers into a center portion of the space S. The mark 400B is provided in the center of an upper surface of the press plate 400X in the width direction thereof, along one side thereof, to enable the user to visually grasp the center position of the catch portion T. Alternatively, a visually-impaired user can easily ascertain the center position of the space S merely by feeling the press plate 400X with their fingers.

The present invention has been described above with reference to specific example embodiments. Nonetheless, the present invention is not limited to the details of example embodiments described above, but various modifications and improvements are possible without departing from the spirit and scope of the present invention. The number, position, shape, and the like, of the above-described constituent elements are not limited to the above-described example embodiments, but may be modified to the number, position, shape, and the like, which are appropriate for carrying out the present invention. It is therefore to be understood that, within the scope of the associated claims, the present invention may be practiced otherwise than as specifically described herein. For example, elements and/or features of different illustrative example embodiments may be combined with each other and/or substituted for each other within the scope of the present invention.

What is claimed is:

1. A rotatable scanner, comprising:
a scanner body comprising an exposure surface on which a document is placed; and
a document holder provided above the scanner body to cover the document placed on the exposure surface of the scanner body;
wherein the scanner body comprises a chamfered front upper edge provided on a side corresponding to a front of the document holder,
wherein on a side of the rotatable scanner corresponding to the front of the document holder, a front end of an upper portion of the document holder protrudes beyond a vertical line that passes through a point corresponding to a front end of the scanner body, wherein the document holder comprises a catch portion extending obliquely upwards to protrude from a front surface of the scanner body, and wherein the catch portion is disposed vertically facing the chamfered front upper edge.

2. The rotatable scanner according to claim 1, wherein the scanner body further comprises walls vertically provided facing each other at both ends of the chamfered front upper edge of the scanner body in a longitudinal direction of the scanner body.

3. The rotatable scanner according to claim 2, wherein the catch portion comprises a sloped surface inclined downwards from a proximal end to a distal end of the rotatable scanner.

4. The rotatable scanner according to claim 3, wherein the sloped surface comprises a concave portion for accommodating one or more fingers of a user.

5. The rotatable scanner according to claim 1, wherein the document holder comprises a hinged side and a free side opposite the hinged side.

6. A rotatable scanner, comprising:
a scanner body comprising an exposure surface on which a document is placed; and
a document holder provided above the scanner body to cover the document placed on the exposure surface of the scanner body;
wherein the document holder comprises a hinged side, a free side opposite the hinged side, and a catch portion at a front end of the free side for opening and closing the document holder with respect to the scanner body,
wherein the catch portion extends obliquely upwards to protrude from a front surface of the document holder and to form a concave portion,
wherein the scanner body further comprises a chamfered front upper edge provided on a side corresponding to the free side of the document holder,
wherein the chamfered front upper edge is disposed facing the concave portion of the catch portion, forming a space between the chamfered front upper edge and the concave portion of the catch portion,
wherein the space accommodates one or more fingers of a user that are inserted into the space when the user opens or closes the document holder with respect to the scanner body, and
wherein the entire concave portion of the catch portion in a longitudinal direction of the catch portion is disposed facing the chamfered front upper edge.

7. The rotatable scanner according to claim 6, wherein the scanner body further comprises a first wall vertically provided at an end of the chamfered front upper edge of the scanner body in a longitudinal direction of the rotatable scanner, wherein the document holder further comprises a first wall vertically provided at an end of the concave portion of the catch portion in the longitudinal direction of the rotatable scanner, and wherein the first wall of the scanner body and the first wall of the document holder are disposed at a same position relative to the longitudinal direction of the rotatable scanner.

8. The rotatable scanner according to claim 6, wherein the scanner body further comprises walls vertically provided facing each other at both ends of the chamfered front upper edge of the scanner body in a longitudinal direction of the scanner body.

9. The rotatable scanner according to claim 6, wherein the chamfered front upper edge of the scanner body comprises a sloped surface inclined upwards from a proximal end to a distal end of the rotatable scanner, and wherein when the document holder is closed with respect to the scanner body, a lower portion of the concave portion of the catch portion and an upper portion of the sloped surface of the chamfered front upper edge are at a same position.

10. The rotatable scanner according to claim 6, wherein the catch portion comprises a handle, and wherein a height of the handle is less than a height of the concave portion of the catch portion.

11. The rotatable scanner according to claim 6, wherein the document holder comprises:
an original tray configured to hold an original document;
a document feeder configured to feed the original document from the original tray; and
an original discharge tray configured to receive the original document fed by the document feeder;
wherein the concave portion of the catch portion is disposed at a front side of the original discharge tray.

12. An image forming apparatus, comprising:
the rotatable scanner according to claim 6.

13. An image forming apparatus, comprising:
the rotatable scanner according to claim 1.

14. The rotatable scanner according to claim 6, wherein the document holder comprises:
an original tray configured to hold an original document;
a document feeder configured to feed the original document from the original tray; and
an original discharge tray configured to receive the original document fed by the document feeder;
wherein a portion of the document holder that faces the chamfered front upper edge of the scanner body is disposed at a front side of the original discharge tray.

* * * * *